May 19, 1925.

R. R. MILLER

SIGNAL OPERATING ATTACHMENT FOR AUTOMOBILES

Filed Dec. 7, 1922

Witnesses:

Inventor:
Richard R. Miller
By Joshua R. H. Potts.
His Attorney

Patented May 19, 1925.

1,538,572

UNITED STATES PATENT OFFICE.

RICHARD R. MILLER, OF CHICAGO, ILLINOIS.

SIGNAL-OPERATING ATTACHMENT FOR AUTOMOBILES.

Application filed December 7, 1922. Serial No. 605,491.

*To all whom it may concern:*

Be it known that I, RICHARD R. MILLER, a citizen of the United States, and a resident of the city of Chicago, county of Cook, and State of Illinois, have invented certain new and useful Improvements in Signal-Operating Attachments for Automobiles, of which the following is a specification.

This invention relates to signal operating attachments for automobiles, and more particularly to a device adapted to operate the horn switch on a certain type of automobile which is placed in an awkward and inconvenient position beneath the steering wheel thereof, such device comprising an operating member adapted to engage the switch button to sound the signal, the member being normally held in inoperative position by the weight thereof, and extending to a point adjacent the rim of the steering wheel where it may be conveniently engaged by the hand of the driver without removing the same from the steering wheel.

Other objects will appear hereinafter.

The invention consists in the combinations and arrangements of parts hereinafter described and claimed.

Figure 1:
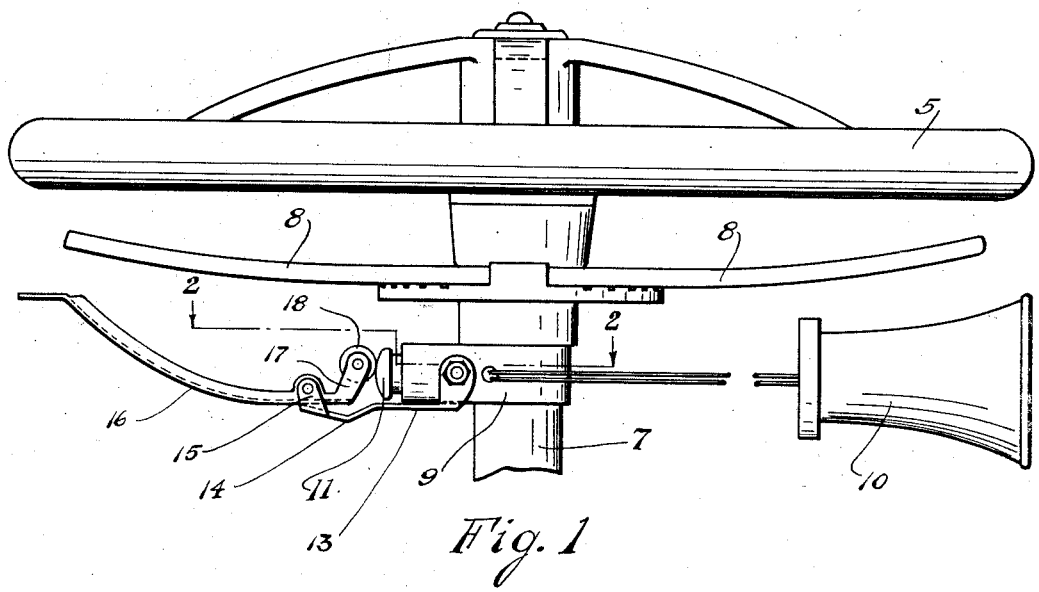

The invention will be best understood by reference to the accompanying drawings forming a part of this specification, and in which, Fig. 1, is a side elevation of a steering wheel and post, having a signal switch mounted on said post, showing the invention arranged in operative position with respect thereto.

Figure 2:
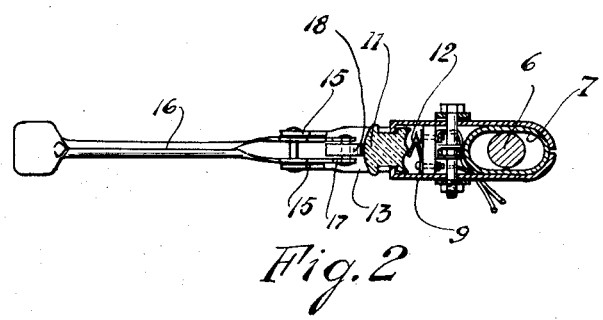
Figure 3:
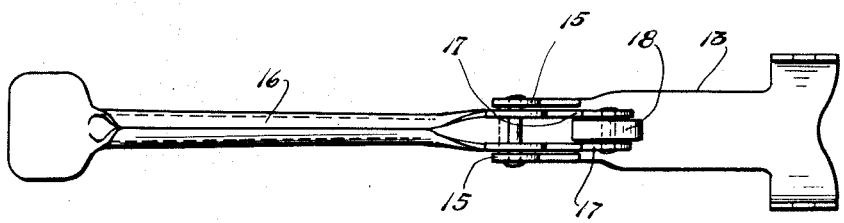

Fig. 2, is a section on the line 2—2 of Fig. 1, showing a portion of the device in full lines, and Fig. 3, is an enlarged top plan view of the invention.

On a certain type of automobile, known as the "Ford," it is common practice to place the horn or other signal operating switch upon the steering post immediately beneath the steering wheel, and in this position the signal is difficult to operate and requires the removal of the hand of the driver from the steering wheel to operate the same.

My invention is designed to provide means whereby the driver of the automobile may operate the signal without removing his hand from the steering wheel, such means being so arranged as to remain in inoperative position by its peculiar construction.

Referring to the drawings, 5 represents a steering wheel of the type ordinarily placed upon a Ford automobile, such steering wheel being mounted upon a shaft 6, which extends through an outer sleeve 7. Levers 8 are mounted on the sleeve 7, such levers being for the purpose of controlling the fuel and spark of the motor in the ordinary manner. Standard construction of a Ford automobile also usually includes a switch casing 9 mounted upon the sleeve 7 as shown, which switch controls a horn 10 or other suitable signal. A push button 11 is mounted in the casing 9, and is adapted to open and close suitable switch mechanism in the casing by the sliding movement thereof, such push button being normally held in inoperative position by means of a spring 12 mounted in the casing 9, all of such construction being old in the art.

Mounted upon the casing 9 is a bracket 13, said bracket preferably being offset as shown at 14, and preferably provided with ears 15 at its outer end. Pivotally mounted between the ears 15 is a lever 16, the inner ends of which are preferably turned as shown at 17, such inner ends being preferably provided with a roller 18, of rubber or other suitable material, adapted, in operative position, to contact the push button 14 to press the same inwardly and close the switch. The outer end of the lever 16 preferably extends to a point adjacent the rim of the steering wheel, the weight of the lever 16 ordinarily retaining the roller 18 out of, or in light, contact, with the push button 14. When it is desired to operate the push button 14, the outer end of the lever 16 may be pressed upwardly by the hand of the driver without removing the same from the rim of the wheel, and when pressure is released from such lever it returns to inoperative position.

While I have illustrated and described the preferred form of construction for carrying my invention into effect, this is capable of variation and modification without departing from the spirit of the invention, I, therefore, do not wish to be limited to the precise details of construction set forth but desire to avail myself of such variations and modifications as come within the scope of the appended claims.

Having described my invention what I claim as new and desire to secure by Letters Patent, is:

1. The combination with a signal operating switch including a casing and a push button thereon; an attachment comprising a bracket having means embracing and firmly secured to the sides of said casing and having ears in line with said push button; and a lever pivotally mounted in said ears beneath the steering wheel and having a turned end with means arranged to operate said push button, said lever being held inoperative by gravity and the outer end of said lever extending to a point adjacent the rim of said steering wheel.

2. The combination with a signal operating switch including a casing mounted upon the steering post of an automobile and having a push button; an attachment comprising a bracket having end portions engaging the sides of said casing and a bolt extending through said portions and casing, said bracket having ears at its other end substantially in line with said push button; and a lever pivotally mounted between said ears and being normally held by gravity in an inoperative position, the inner end of said lever being turned and having means for engaging said push button.

3. The combination with a signal operating switch including a casing with a push button mounted on the steering post of an automobile, and an attachment comprising a bracket extending longitudinally of said casing and having end portions secured to diametrically opposite sides of said casing and fastened thereon by means of a bolt; ears at the other end of said bracket substantially in line with said push button; and a lever pivotally mounted between said ears and having an upturned end with a roller with yieldable material for engaging said push button, said lever being normally held by gravity in an inoperative position and the outer end of said lever extending to a point beneath the rim of the steering wheel.

In testimony whereof I have signed my name to this specification in the presence of a subscribing witness.

RICHARD R. MILLER.

Witness:

JOSHUA R. H. POTTS.